US008467361B2

(12) United States Patent
Luetschwager et al.

(10) Patent No.: US 8,467,361 B2
(45) Date of Patent: Jun. 18, 2013

(54) INTELLIGENT WIRELESS ACCESS POINT NOTIFICATION

(75) Inventors: Jon Luetschwager, Cumming, GA (US); Brian Keller, Milton, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 321 days.

(21) Appl. No.: 12/939,258

(22) Filed: Nov. 4, 2010

(65) Prior Publication Data

US 2012/0113892 A1    May 10, 2012

(51) Int. Cl.
*H04W 8/00* (2009.01)

(52) U.S. Cl.
USPC .......................................... 370/338; 370/328

(58) Field of Classification Search
USPC ................................. 370/328, 338
See application file for complete search history.

(56) References Cited

U.S. PATENT DOCUMENTS

| 7,499,438 | B2 | 3/2009 | Hinman et al. |
| 7,535,880 | B1 | 5/2009 | Hinman et al. |
| 7,554,979 | B2 | 6/2009 | Ikeda |
| 7,639,637 | B2 | 12/2009 | Honjo et al. |
| 7,885,639 | B1 | 2/2011 | Satish et al. |
| 8,131,859 | B2 * | 3/2012 | Fujii et al. ..................... 709/228 |
| 2010/0017847 | A1 | 1/2010 | Kawai |
| 2010/0124213 | A1 | 5/2010 | Ise et al. |
| 2010/0317371 | A1 * | 12/2010 | Westerinen et al. ....... 455/456.6 |
| 2011/0058536 | A1 * | 3/2011 | Tsuchiya et al. .............. 370/338 |

* cited by examiner

*Primary Examiner* — Brian D Nguyen
(74) *Attorney, Agent, or Firm* — Toler Law Group, PC

(57) ABSTRACT

In one or more embodiments, one or more methods and/or systems described can perform determining identification information associated with the first wireless access point from at least a first signal; determining that a first instance of encountering the first wireless access point has concluded; storing information associated with the first instance of encountering the first wireless access point; determining the identification information associated with the first wireless access point from at least a second signal; determining that a second instance of encountering the first wireless access point has concluded; storing information associated with the second instance of encountering the first wireless access point; determining that the first wireless access point has been encountered at least a number of times; and displaying, in a menu usable by a user, at least a portion of the identification information associated with the first wireless access point.

18 Claims, 11 Drawing Sheets

INTELLIGENT WIRELESS ACCESS POINT NOTIFICATION

BACKGROUND

1. Technical Field

This disclosure relates generally to the field of notifying a user of a mobile device that one or more wireless access points are available, and, more specifically, this disclosure pertains to the field of automatically determining, based on a configuration, whether or not to notify the user of the mobile device that the one or more wireless access points are available.

2. Description of the Related Art

Mobile devices are used in a variety of locations where wireless access of a network can be available to the mobile devices. In one example, wireless access of the Internet, via one or more access points, can be available to a mobile device operated by a user, and the mobile device can convey information associated with the one or more access points to the user. In the past, mobile devices displayed all service set identifiers (SSIDs) of all access points within range of the mobile devices which can be or become disturbing and/or annoying to users.

BRIEF DESCRIPTION OF THE DRAWINGS

The preferred embodiments will become apparent upon reading the following detailed description and upon reference to the accompanying drawings in which.

Figure 1:
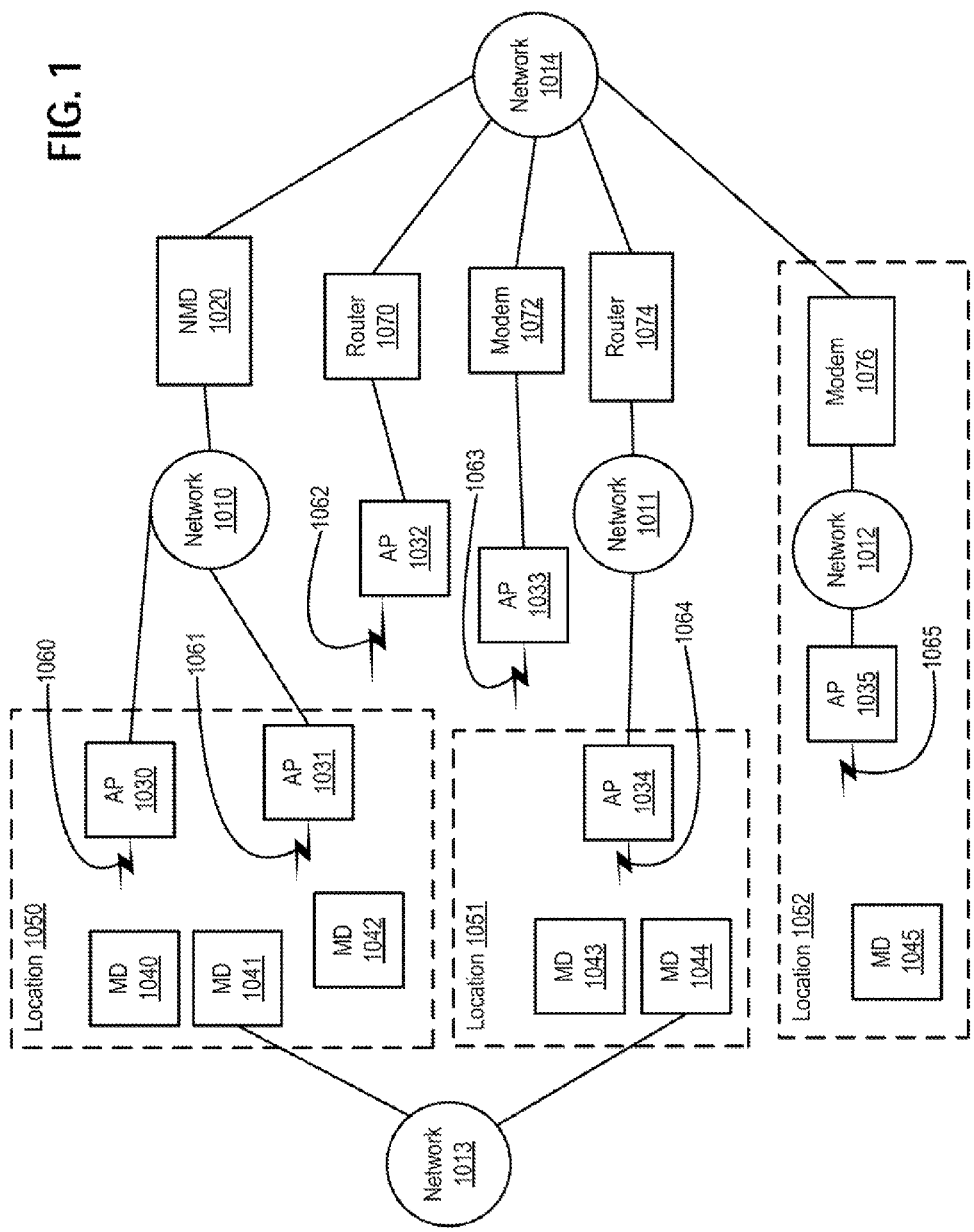
FIGS. 1 and 2 provide block diagrams of one or more network communication systems, according to one or more embodiments.

While the invention is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims.

DETAILED DESCRIPTION

FIG. 1 illustrates a block diagram of one or more network communications systems, according to one or more embodiments. As shown, mobile devices (MDs) 1040-1042 and a wireless access points (APs) 1030 and 1031 can be at a location 1050; MDs 1043 and 1044 and a wireless access point (AP) 1034 can be at a location 1051; and a mobile device (MD) 1045, a wireless AP 1035, a network 1012, and a modem 1076 can be at a location 1052. In one or more embodiments, locations 1050-1052 can include one or more of hotels, homes, businesses, airports, restaurants, geographic regions, planes, trains, automobiles, and coffee shops, among others.

In one or more embodiments, a wireless AP can communicate with one or more computing devices (e.g., MDs 1040-1045) in a wireless fashion. For example, a wireless AP can communicate with one or more computing devices (e.g., MDs 1040-1045) using one or more of Institute of Electrical and Electronics Engineers (IEEE) 802.16, WiMax, IEEE 802.11, WiFi (e.g., wireless Ethernet), IEEE 802.15 (e.g., Bluetooth), IEEE 802.15.4, ZigBee, 6LoWPAN, ultra wide band, and/or infrared communication technologies, among others. In one or more embodiments, a wireless access point can include a transceiver to communicate with one or more computing devices using one or more wireless methods, processes, and/or protocols.

In one or more embodiments, wireless APs 1030-1035 can respectively transmit one or more signals 1060-1065. In one or more embodiments, the one or more signals transmitted from a wireless AP (e.g., one or more signals 1060 transmitted from wireless AP 1030) can include identification information. For example, wireless AP 1030 can be a wireless AP that implements one or more portions of IEEE 802.11, and wireless AP 1030 can transmit one or more signals 1060 that can include identification information that can include one or more of a service set identifier (SSID) and a basic service set identifier (BSSID). In one or more embodiments, the one or more signals 1060-1065 can include respective beacons that can include the respective identification information usable to identify respective wireless APs 1030-1035.

In one or more embodiments, one or more of the one or more signals 1060-1065 and/or one or more of wireless APs 1030-1035 can utilize one or more ISM (industrial, scientific and medical) bands to communicate information to and/or from one or more of MDs 1040-1045. For example, an ISM band can include an electromagnetic signal frequency range of 6.765-6.795 MHz, 433.05-434.79 MHz, 902-928 MHz, 2.4-2.5 GHz, 5.725-5.875 GHz, or 24.0-24.25 GHz, among others. In one or more embodiments, an ISM band can be used in identifying a wireless AP.

In one or more embodiments, the one or more signals transmitted from the wireless AP can be received by one or more MDs. In one example, one or more of MDs 1040-1042 can receive one or more signals 1060 from wireless AP 1030, and one or more of MDs 1040-1042 can utilize identification information included in one or more signals 1061 to identify wireless AP 1031. In a second example, one or more of MDs 1043 and 1044 can utilize identification information included in one or more signals 1064 to identify wireless AP 1034, and MD 1045 can utilize identification information included in one or more signals 1065 to identify wireless AP 1035. In one or more embodiments, a MD can convey identification of a wireless AP to a user of the MD. For example, MD 1040 can identify wireless AP 1030 via the identification information included in one or more signals 1060 and convey identification of wireless AP 1030 to a user of MD 1040. For instance, MD 1040 can convey identification of wireless AP 1030 to the user of MD 1040 via a pop-up window or menu.

In one or more embodiments, a MD can convey identification of a wireless AP to a user of the MD after a number of instances that the wireless AP has been encountered. For example, an instance that wireless AP 1030 has been encountered can include a first period of time of receiving the identification information included in one or more signals 1060 followed by a second period of time of not receiving the identification information included in one or more signals

1060. For instance, MD 1040 can be transported out of a range that MD 1040 can utilize one or more signals 1060. For example, MD 1040 can be transported from location 1050 to a location 1052 which can be out of a range that MD 1040 can utilize one or more signals 1060.

In one or more embodiments, the second period of time can include an amount of time transpiring during which another instance of encountering a wireless AP may not be counted, enumerated, and/or started. For example, MD 1042 may be close to and/or proximate to a range that MD 1042 can utilize one or more signals 1060. For instance, the range that MD 1042 can utilize one or more signals 1060 may be two hundred feet, and MD 1042 may be transported within location 1050 such that MD 1042 is within the two hundred foot range and outside the two hundred foot range within the second period of time. In one or more embodiments, MD 1042 may not count, enumerate, and/or start another instance of encountering wireless AP 1030 during the second period of time to discriminately measure a number of times that wireless AP 1030 has been encountered. For example, the amount of time transpiring may be ten minutes or longer, and by discriminately measuring the number of times that wireless AP 1030 has been encountered by MD 1042 may not be misleading, since MD 1042 has been transported in and out of the range that MD 1042 can utilize one or more signals 1060 during the amount of time transpiring.

In one or more embodiments, one or more MDs can receive one or more signals that convey identification of a wireless AP which may not be included at one or more locations that includes the one or more MDs. In one example, one or more of MDs 1040-1042, at location 1050, can receive one or more signals 1062 that can include identification information associated with wireless AP 1032. In a second example, one or more of MDs 1043 and 1044, at location 1051, can receive the one or more signals 1062 and/or one or more signals 1063 that can include identification information associated with respective wireless APs 1032 and 1033. In another example, MDs 1043 and 1044, at location 1051, can receive the one or more signals 1061 that can include identification information associated with wireless AP 1031, at location 1050.

In one or more embodiments, MDs 1040, 1042, and 1045 can be wirelessly coupled to respective wireless APs 1030, 1031, and 1035. In one example, MDs 1040, 1042, and 1045 can be wirelessly coupled to respective wireless APs 1030, 1031, and 1035 after MDs 1040, 1042, and 1045 identify respective wireless APs 1030, 1031, and 1035 a respective number of instances. As illustrated, wireless APs 1030 and 1031 can be coupled to a network 1010 that can be coupled to a network management device (NMD) 1020. In one or more embodiments, MDs 1040 and 1042 can be coupled to network 1010 via respective wireless APs 1030 and 1031, and MD 1045 can be coupled to a network 1012 via wireless AP 1035. As shown, network 1010, wireless AP 1032, wireless AP 1033, a network 1011, and a network 1012 can be coupled to a network 1014 via NMD 1020, a router 1070, a modem 1072, a router 1074, and a modem 1076, respectively, and wireless APs 1034 and 1035 can be respectively coupled to networks 1011 and 1012.

In one or more embodiments, MDs 1041 and 1044 can be coupled to and communicate with a network 1013. In one example, MD 1041 may not have counted and/or enumerated a number of instances of identifying one or more of wireless APs 1030 and 1031. In a second example, MD 1041 may not have counted and/or enumerated a number of instances of identifying wireless AP 1030 and have counted and/or enumerated a number of instances of identifying wireless AP 1031 but a configuration and/or data structure of MD 1041 may not permit MD 1041 to communicate with wireless AP 1031. In another example, MD 1041 may not have counted and/or enumerated a number of instances of identifying wireless AP 1034.

In one or more embodiments, network 1013 can be and/or implement a telecommunications network. For instance, network 1013 can be and/or implement a wireless telecommunications network that can support one or more wireless telecommunications network protocols such as one or more of General Packet Radio Service (GPRS), enhanced data rates for GSM evolution (EDGE), long term evolution (LTE), CDMA (code division multiple access), TDMA (time division multiple access), and/or FDMA (frequency division multiple access), among others. In one or more embodiments, network 1013 can be coupled to and/or include a telephony network that can include a wireless cellular telecommunications network and/or a wireless satellite telecommunications network. In one or more embodiments, the telephony network can communicate information such as voice and/or data.

In one or more embodiments, network 1013 can implement and/or provide access and/or services of one or more other networks. For example, network 1013 can provide access and/or services of a public network (e.g., the Internet) to one or more of MDs 1040-1045 via one or more base transceiver stations and/or one or more satellites. In one or more embodiments, one or more antennas of a base transceiver station can be mounted on a roof of a building, on a mast, on a tower (e.g., a cellular telephone communications tower), and/or on a side of a structure (e.g., a building, a parking garage, a lamp post, etc.). In one or more embodiments, access to these other networks can include one or more "services" these other networks may provide. In one or more embodiments, the one or more services can utilize, be associated with, and/or correspond to one or more protocols of one or more computer and/or software applications. In one or more embodiments, network 1013 provides access and/or services of one or more other networks at a lower data rate than network 1014 can provide to one or more of MDs 1040-1045. For example, network 1013 can include less bandwidth than network 1014. In one or more embodiments, network 1014 can provide access and/or services of one or more other networks to MDs 1040-1045 via one or more wireless APs 1030-1035, one or more routers 1070 and 1074, one or more modems 1072 and 1076, and/or one or more network management devices (NMDs) such as NMD 1020.

In one or more embodiments, access to one or more of networks 1013 and 1014 can include one or more "services" these networks may provide. For example, these one or more services can include one or more of: email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, the one or more service can be associated with and/or correspond to one or more protocols of one or more computer and/or software applications.

In one or more embodiments, NMD 1020 can provide authentication, quality of service (QoS), communication traffic shaping, and/or access control from one or more computing devices (e.g., MDs 1040 and 1042) coupled to network 1010 through one of APs 1030 and 1031 to network 1014. For example, NMD 1020 can include an access control list that can be modifiable, and NMD 1020 can use the access control list to permit and/or deny access of one or more computing devices (e.g., MDs 1040 and 1042) to network 1014. In one or more embodiments, NMD 1020 can perform one or more processes and/or methods that can modify the access control list. In one or more embodiments, NMD 1020 can receive one or more signals from a remote signaling device, and the access control list of NMD 1020 can be modified based on the received one or more signals from the remote signaling device. In one or more embodiments, signals and/or signaling can be used in communicating establishment and/or control of communications and/or access to a network and/or resources of the network. In one or more embodiments, signals and/or signaling can be used between two different network providers or between two systems of a single network provider. In one example, a first network provider can be or include a second network provider, and signals and/or signaling can be used between the first network provider and the second network provider can mean signaling between two systems of the first network provider. In one or more embodiments, signals and/or signaling can be used to convey information (e.g., configuration messages, accounting messages, control data, etc.) that is different than user information transfer (e.g., a telephone conversation between two users, a text message communication between two users, etc.).

In one or more embodiments, networks 1010, 1011, 1012, and/or network 1014 can include a wired network, a wireless network or a combination of wired and wireless networks. Networks 1010, 1011, 1012, and/or network 1014 can include and/or be coupled to various types of communications networks, such as a public switched telephone network (PSTN), an Internet, a wide area network (WAN) (e.g., a private WAN, a corporate WAN, a public WAN, etc.), a local area network (LAN). In one or more embodiments, NMD 1020 can be coupled to a PSTN, e.g., Ethernet cable and DSL; a cable (television) based network; a satellite-based system; and/or a fiber based network; among others. In one or more embodiments, networks 1010, 1011, 1012, and/or network 1014 can include one or more wireless networks, e.g., based on IEEE 802.11 and/or IEEE 802.16. For instance, one or more of APs 1030 and 1031 can be coupled to network 1010 in a wireless fashion. Networks 1010, 1011, 1012, and/or network 1014 can include one or more DSL (digital subscriber line) and/or cable (e.g., cable television) networks and/or infrastructures. For example, networks 1010, 1011, 1012, and/or network 1014 can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, network 1014 may form part of the Internet, or may couple to other networks, e.g., other local or wide area networks such as the Internet. In one or more embodiments, NMD 1020 can be a system operable to include one or more of network 1010, wireless AP 1030, wireless AP 1031, and/or various networking equipment, among others.

In one or more embodiments, each MD of MDs 1040-1045 can include and/or can be coupled to one or more transceivers that allow the MD to communicate with network 1013 and one or more of wireless APs 1030-1035. For example, MD 1041 can include or be coupled to a first transceiver that can communicate with network 1013 and include or be coupled to a second transceiver to communicate with wireless AP 1030.

For instance, MD 1041 can include or be coupled to a first transceiver that can communicate with one or more a base transceiver station and a satellite of or coupled to network 1013 and include or be coupled to a second transceiver, such as a wireless Ethernet transceiver, to communicate with wireless AP 1030.

Figure 2:
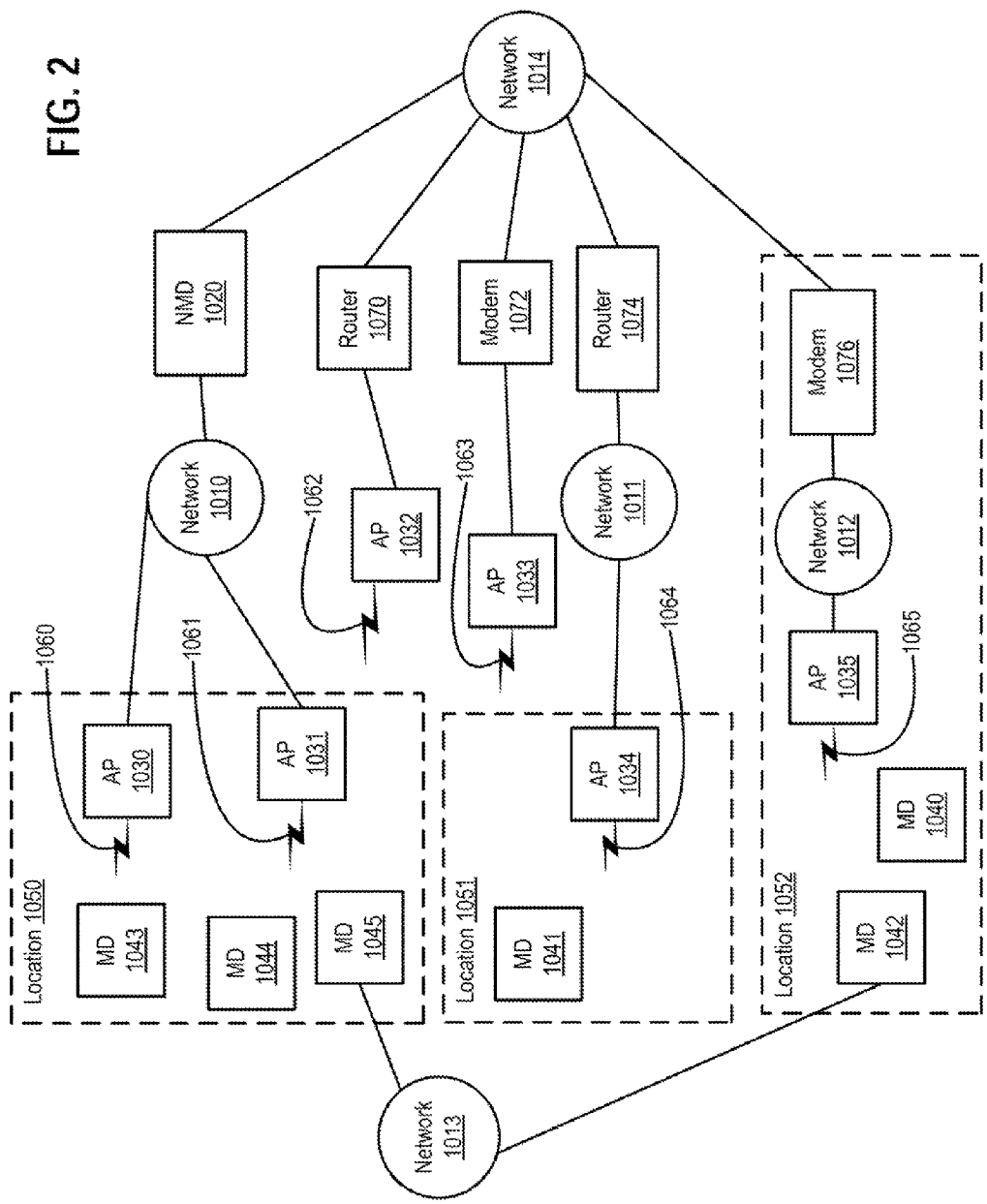

Turning now to FIG. 2, a block diagram of one or more network communications systems, according to one or more embodiments. Each of the elements illustrated in FIG. 2 is described with reference to FIG. 1. As illustrated, one or more of MDs 1040-1045 can be transported from a first location to a second location. For example: MD 1040 can be transported from location 1050 to location 1052; MD 1041 can be transported from location 1050 to location 1051; MD 1042 can be transported from location 1050 to location 1052; MD 1043 can be transported from location 1051 to location 1050; MD 1044 can be transported from location 1051 to location 1050; and MD 1045 can be transported from location 1052 to location 1050.

In one or more embodiments, MDs 1043, 1044, and 1040 can be wirelessly coupled to respective wireless APs 1030, 1031, and 1035. In one example, MDs 1043, 1044, and 1040 can be wirelessly coupled to respective wireless APs 1030, 1031, and 1035 after MDs 1043, 1044, and 1040 identify respective wireless APs 1030, 1031, and 1035 a respective number of instances.

In one or more embodiments, MDs 1042 and 1045 can be coupled to and communicate with a network 1013. In one example, MD 1045 may not have counted and/or enumerated a number of instances of identifying one or more of wireless APs 1030 and 1031. In a second example, MD 1045 may not have counted and/or enumerated a number of instances of identifying wireless AP 1030 and have counted and/or enumerated a number of instances of identifying wireless AP 1031 but a configuration and/or data structure of MD 1045 may not permit MD 1045 to communicate with wireless AP 1031. In another example, MD 1042 may not have counted and/or enumerated a number of instances of identifying wireless AP 1035.

In one or more embodiments, location 1052 can be or be included in a vehicle. For example, location 1052 can be or be included in a plane, train, or automobile, and location 1052 can move from one point to anther point at one or more speeds and/or directions. For instance, one or more of MDs 1040 and 1042 can receive identification information associated with one or more of wireless APs 1030-1034 via respective one or more signals 1060-1064 when in a range to utilize such one or more signals.

Figure 3:
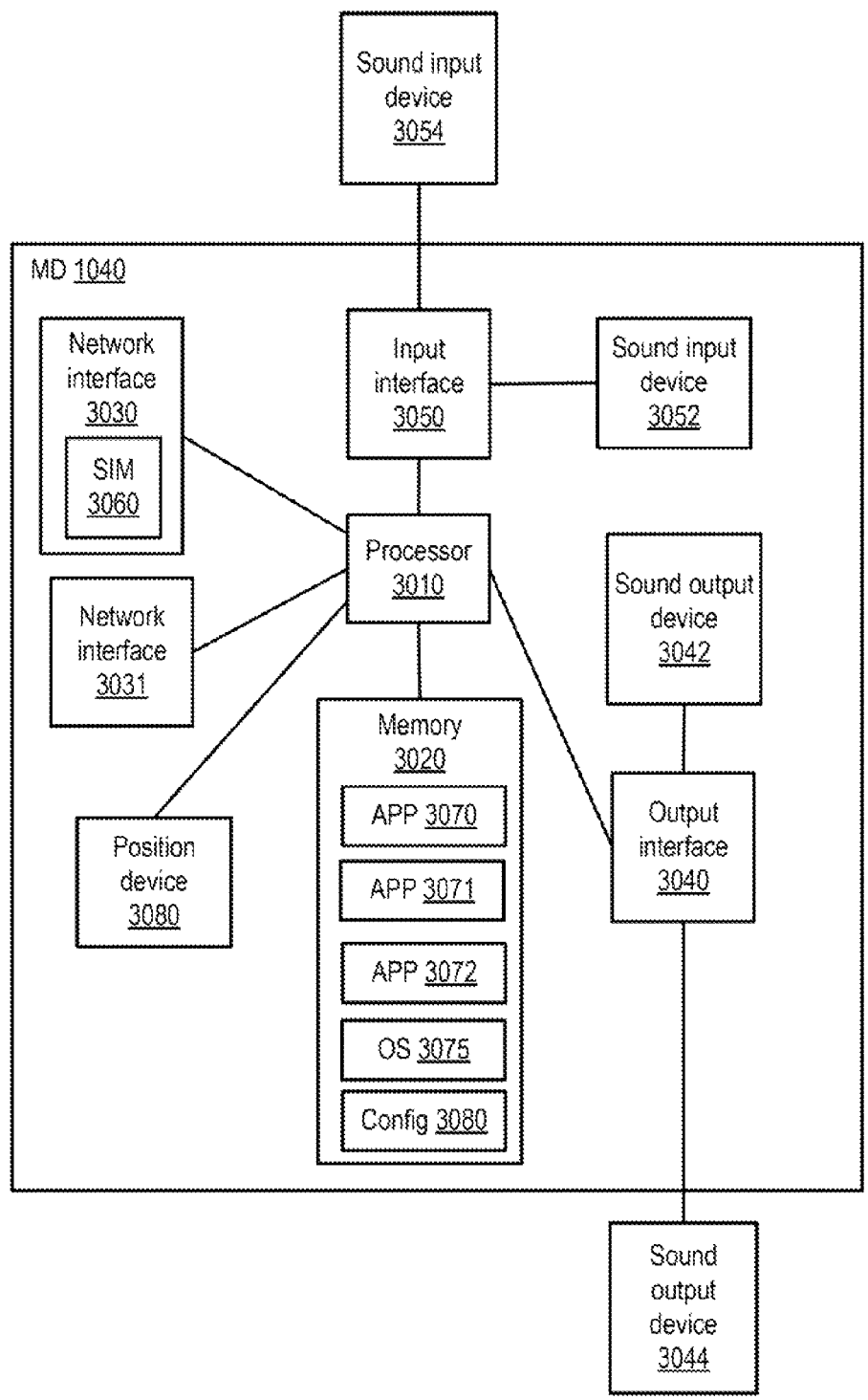
FIG. 3 provides a block diagram of a mobile device, according to one or more embodiments.

Turning now to FIG. 3, a block diagram of a mobile device is illustrated, according to one or more embodiments. As shown, MD 1040 can include a memory 3020 coupled to a processor 3010, and MD 1040 can include one or more network interfaces 3030 and 3031, user output interface 3040, and/or user input interface 3050 coupled to processor 3010. In one or more embodiments, memory 3020 can include one or more applications (APPs) 3070-3072 and/or operating system (OS) 3075 that can include instructions executable by processor 3010 to implement one or more methods and/or one or more systems associated with MD 1040. In one or more embodiments, OS 3075 can include one or more structures and/or functionalities describe with reference to one or more of APPs 3070-3072. In one or more embodiments, memory 3020 can include a configuration (config) 3080 that can include one or more configurations and/or one or more user preferences usable in operation of MD 1040 and/or to implement one or more methods and/or one or more systems associated with MD 1040. In one or more embodiments, MD 1040 may be any of various types of devices, including a computer system, a portable computer system, a tablet computer system, a personal digital assistant (PDA), a mobile telephone (e.g., a wireless telephone, a cellular telephone, a satellite telephone, etc.), a wearable computing device, an Internet appliance, a communications device, or wireless device.

In one or more embodiments, user output interface 3040 can be used to convey information (e.g., text, graphics, video, audio, etc.) to a user of MD 1040. For example, MD 1040 may include a display (e.g., a display screen) that can be used to convey text, graphic, and/or video information to a user of MD 1040. In one or more embodiments, MD 1040 can include a sound output device 3042 coupled to user output interface 3040. In one or more embodiments, sound output device 3042 can include a device and/or circuitry that can produce one or more sounds.

In one or more embodiments, a sound can be an alteration in pressure, an alteration particle displacement, and/or an alteration particle velocity that can be propagated in one or more elastic mediums. In one or more embodiments, a sound can be a superposition of one or more propagated alterations of pressure, particle displacement, and/or velocity that can be propagated in one or more elastic mediums, and one or more sounds can propagate through the one or more elastic mediums via one or more sound waves. In one or more embodiments, an intensity of a sound wave can be sound energy transmitted, and an intensity of a sound field can be sound energy transmitted per a time period through an area perpendicular to a direction of transmission at a point in a coordinate system. For example, an intensity of a sound field can be measured in ergs per second per centimeters squared.

In one or more embodiments, sound output device 3042 can include a body that can produce vibrations to create one or more sounds. For instance, sound output device 3042 can include a speaker that can produce one or more sounds, audible to a user of MD 1040, by vibrating a body (e.g., a diaphragm, a crystal, a ceramic, etc.).

In one or more embodiments, user output interface 3040 can be coupled to a sound output device 3044. In one instance, sound output device 3044 can include one or more of an amplifier and/or a speaker. In another instance, sound output device 3044 can include one or more earphones. In one or more embodiments, user output interface 3040 can be coupled to sound output device 3044 in a wired fashion. In one or more embodiments, user output interface 3040 can be coupled to sound output device 3044 in a wireless fashion. In one example, user output interface 3040 can communicate sound information to output device 3044 using an ISM band. For instance, user output interface 3040 can communicate sound information to output device 3044 using one or more of a personal are network (PAN), IEEE 802.15, IEEE 802.15.4, ZigBee, 6LoWPAN, frequency modulation of a carrier wave, amplitude modulation of a carrier wave, light signals, and serial pulses, among others. In one or more embodiments, sound output device 3044 can be or be included in a device that includes IEEE 802.15 receiver or transceiver, such as a Bluetooth headset or earpiece.

In one or more embodiments, user input interface can be used to receive user input from a user of MD 1040. In one example, MD 1040 may include a keyboard that can be used to receive user input from a user of MD 1040. In another example, MD 1040 may include a one or more sensors that can be used to receive user input from a user of MD 1040. In one instance, one or more sensors can include resistive sensors that can be used to determine one or more positions on a display screen. In another instance, one or more sensors can include capacitive sensors that can be used to determine one or more positions on a display screen. In one or more embodiments, user output interface 3040 and user input interface can be used to implement a keyboard. For example, user output interface 3040 can be used to present an image of a keyboard, and user input interface 3050 can receive a position of user input on the image of the keyboard to determine a received key of the keyboard. In one or more embodiments, MD 1040 can include a sound input device 3052 coupled to user input interface 3050.

In one or more embodiments, a sound input device can include a device and/or circuitry that can receive one or more sounds and transform the one or more sounds into one or more electrical signals (e.g., voltage and/or current). In one or more embodiments, a sound input device can include an acoustic to electric transducer or sensor that can convert one or more sounds into one or more electrical signals. For example, the acoustic to electric transducer or sensor can include a body (e.g., a diaphragm, a crystal, a ceramic, etc.) that can vibrate in response to one or more sounds (e.g., in response to sound pressure), and movement of the body can be transformed and/or converted into one or more electrical signals. For instance, a sound input device can include a microphone. In one or more embodiments, a microphone can use one or more of capacitance change (e.g., a condenser microphone), electromagnetic induction (e.g., a dynamic microphone), piezoelectric generation, and light modulation to produce one or more electrical signal from one or more mechanical vibrations.

In one or more embodiments, user input interface 3050 can be coupled to a sound input device 3054. In one instance, sound input device 3054 can include one or more of an amplifier and/or a microphone. In one or more embodiments, user input interface 3050 can be coupled to sound input device 3054 in a wired fashion. In one or more embodiments, user input interface 3050 can be coupled to sound input device 3054 in a wireless fashion.

In one example, sound input device 3054 can communicate sound information to user input interface 3050 with using an ISM band. For instance, sound input device 3054 can communicate sound information to user input interface 3050 using one or more of a PAN, IEEE 802.15, IEEE 802.15.4, ZigBee, 6LoWPAN, frequency modulation of a carrier wave, amplitude modulation of a carrier wave, light signals, and serial pulses, among others. In one or more embodiments, sound input device 3054 can be or be included in a device that includes IEEE 802.15 transmitter or transceiver, such as a Bluetooth headset or microphone.

In one or more embodiments, network interface 3030 can be used to couple MD 1040 to network 1013, and MD 1040 can use network interface 3030 to communicate information (e.g., data, voice data, etc.) with network 1013. For example, network interface 3030 can include a transceiver that is operable to communicate information with network 1013. In one or more embodiments, network interface 3030 can include a subscriber identity module (SIM) 3060. In one or more embodiments, SIM 3060 can securely store an international mobile subscriber identity (IMSI) which can include a unique number and/or identity associated with a global system for mobile communications (GSM) network and/or a universal mobile telecommunications system (UMTS) network. In one example, the unique number and/or identity can be used to determine information corresponding to MD 1040 from a home location register (HLR) and/or from a visitor location register (VLR). In one or more embodiments, a MSISDN (mobile subscriber ISDN (integrated services digital network) number, mobile station international ISDN number(s), or mobile international ISDN number) can be a number that can uniquely identify a subscription in a GSM mobile network and/or a UMTS (universal mobile telecommunications system) mobile network. For example, the MSISDN can include a telephone number corresponding to SIM 3060. In one instance, the MSISDN can include a country code, a national destination code, and a subscriber number. In another instance, the MSISDN can include a country code, a number planning area, and a subscriber number.

In one or more embodiments, SIM 3060 can be embodied in a removable card (e.g., a SIM card) that can be removed from a first MD associated with a first subscriber account and placed in a second MD, so that the second MD can be associated with the first subscriber account. For example, SIM 3060 embodied as a SIM card can be associated with a first subscriber account and used in MD 1040, thereby associating MD 1040 with the first subscriber account; SIM 3060 can be removed from MD 1040, thereby disassociating MD 1040 with the first subscriber account; and SIM 3060 can be placed in MD 1041, thereby associating MD 1041 with the first subscriber account.

In one or more embodiments, network interface 3031 can be used to communicate with a wireless AP. For example, network interface 3031 can be used to communicate with wireless AP 1030. In one or more embodiments, network interface 3031 can include a transceiver that is operable to communicate information with wireless AP 1030.

In one or more embodiments, MD 1040 can include a position device 3080 coupled to processor 3010. In one example, position device 3080 can include a global positioning system (GPS) receiver. In another example, position device 3080 can include a terrestrial radio navigation system receiver such as LORAN (LOng RAngeNavigation). In one or more embodiments, position device 3080 can provide one or more services such as one or more of positioning, navigation, and timing to processor 3010. For example, a positioning service can provide one or more of latitude information, longitude information, altitude information, and accuracy information (e.g., a radius of uncertainty for a geographic location or position). In one or more embodiments, one or more of wireless MDs 1041-1045 can include same and/or similar one or more structures and/or one or more functionalities as described with reference to MD 1040.

In one or more embodiments, the term "memory" can mean a "memory medium" and/or "computer readable memory medium" which is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium can include other types of memory as well, or combinations thereof. In one or more embodiments, the memory medium can be and/or include an article of manufacture and/or a software product. In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, personal digital assistant (PDA), tablet computing device, laptop, mobile telephone, mobile multimedia device, embedded computer system, television system, and/or other device. In general, the terms "computing device", "computer", and/or "computer system" can be broadly defined to encompass any device having a processor which executes instructions from a memory medium. In one or more embodiments, the memory medium in one or more systems can store a software program and/or data for performing and/or enabling processes and/or methods described herein. In one or more embodiments, a CPU or processing unit in one or more systems executing code and data from a memory medium includes a means for executing one or more software program according to the methods and/or flowcharts described herein.

Figure 4:
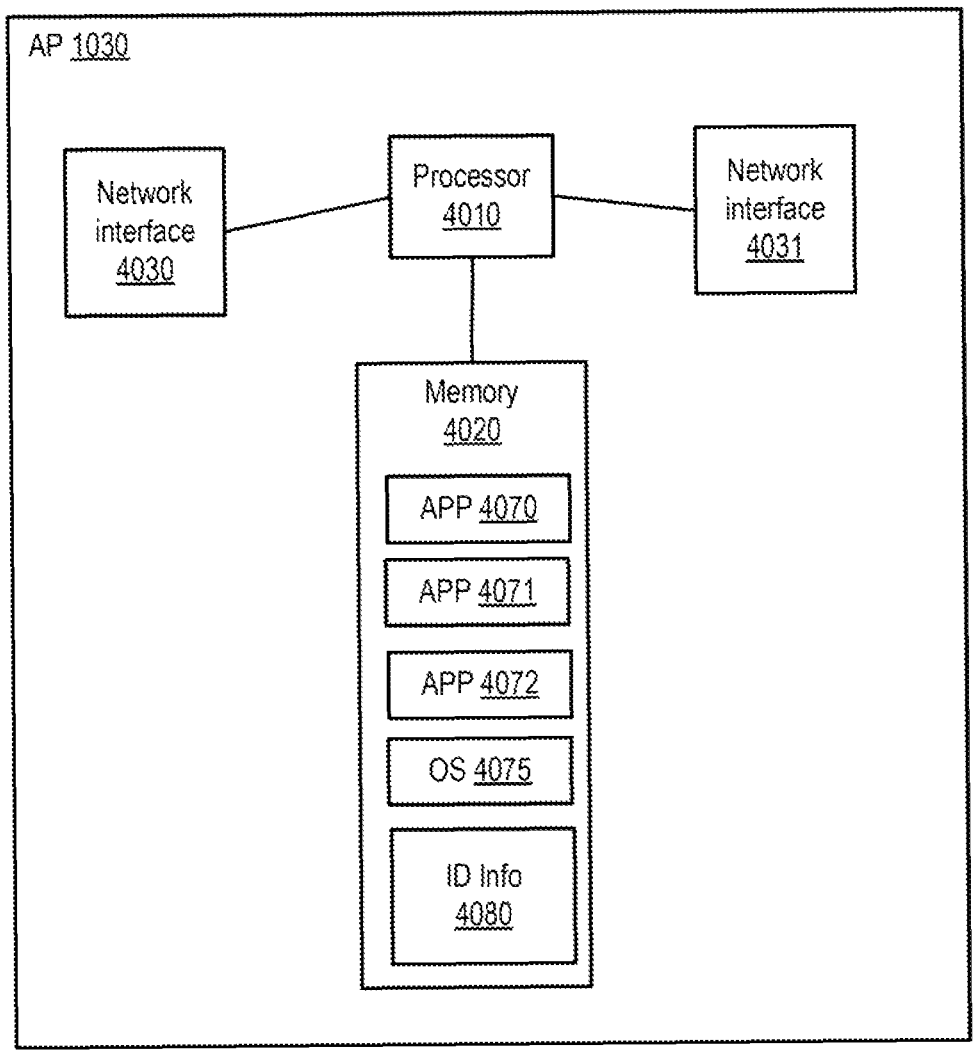
FIG. 4 provides a block diagram of a wireless access point, according to one or more embodiments.

Turning now to FIG. 4, a block diagram of a wireless access point is illustrated, according to one or more embodiments. As shown, wireless AP 1030 can include a memory medium 4020 coupled to a processor 4010, and wireless AP 1030 can include one or more network interfaces 4030 and 4031 coupled to processor 4010.

In one or more embodiments, a network interface (e.g., network interface 4030) can be coupled to a network, a router, or a modem, among others. In one example, network interface 4030 can implement an Ethernet interface that is operable to be coupled to a gateway device, where the gateway device is operable to be coupled to network 1014. In another example, network interface 4030 can implement a WiMax network interface that is operable to be coupled to a WiMax access point that is operable to be coupled to network 1014. In one or more embodiments, a network interface (e.g., network interface 4031) can be coupled to one or more MDs in a wireless fashion. In one example, network interface 4031 can implement an IEEE 802.11 interface that can wirelessly communicate with one or more MDs. In a second example, network interface 4031 can implement an IEEE 802.16 interface that can wirelessly communicate with one or more MDs. In another example, network interface 4031 can implement a wireless USB interface that can wireless communicate with one or more MDs.

As shown, memory medium 4020 can include one or more APPs 4070-4072 and/or an OS 4075 that can store data and/or instructions executable by processor 4010 to implement one or more systems, processes, and/or methods associated with wireless AP 1030. As illustrated, memory medium 4020 can include identification information (ID info) 4080 associated with wireless AP 1030. In one or more embodiments, the one or more signals 1060 can include identification information 4080 or can include information based on identification information 4080 which can be used to identify wireless AP 1030. In one or more embodiments, network interface 4031 can implement one or more portions of at least one of IEEE 802.16, WiMax, IEEE 802.11, IEEE 802.15, IEEE 802.15.4, ZigBee, 6LoWPAN, ultra wide band, and an infrared communication protocol. For example, network interface 4031 can implement one or more portions of IEEE 802.11, and network interface 4031 can transmit one or more signals 1060 that can include identification information that can include one or more of a SSID, a BSSID, an Internet protocol (IP) address, a WEP (wired equivalence privacy) code, and a WiFi protected access (WPA) code, among others.

In one instance, identification information 4080 can include information that can be used to produce one or more of the SSID, the BSSID, the WEP code, and the WPA code. In another instance, identification information 4080 can include one or more of the SSID, the BSSID, the IP address, the WEP code, and the WPA code, among others. In one or more embodiments, identification information 4080 can include one or more strings of characters that can be or can be used in one or more of the SSID, the BSSID, the IP address, the WEP code, and the WPA code, among others. In one example, a string of characters utilized in the SSID can include "CupOfJoe", and location 1050 can include the Cup of Joe Coffee Shop. In another example, a string of characters utilized in the WPA code can include "RikerOmega3!!!".

In one or more embodiments, the BSSID can include an address of network interface 4031. For example, the BSSID can include a media access control (MAC) address of network interface 4031. In one instance, the BSSID can be stored in network interface 4031. In another instance, the BSSID can be stored in identification information 4080. In one or more embodiments, a MAC address can be a unique identifier of a network interface. In one example, the MAC address can be assigned by a manufacturer of the network interface. In another example, the MAC address can be configured by software (e.g., overriding an address assigned by a manufacturer). In one or more embodiments, the MAC address can include a 48-bit address or number. In one or more embodiments, the MAC address can include a 64-bit address or number. In one or more embodiments, a network address, such as a MAC address among other network addresses, can include other lengths or sizes.

It is noted that the IEEE expects that 48-bit MAC address will be exhausted no sooner than the year 2100 Anno Domini. Accordingly, a 48-bit may be considered substantially unique (e.g., few duplications) after some point in the future, according to one or more embodiments. In one or more embodiments, 64-bit MAC addresses can be used in one or more of IPv6 (Internet protocol version six), ZigBee, IEEE 802.15.4, and 6LoWPAN, among others. In one or more embodiments, one or more of wireless APs 1031-1035 can include same and/or similar one or more structures and/or one or more functionalities as described with reference to wireless AP 1030.

Figure 5:
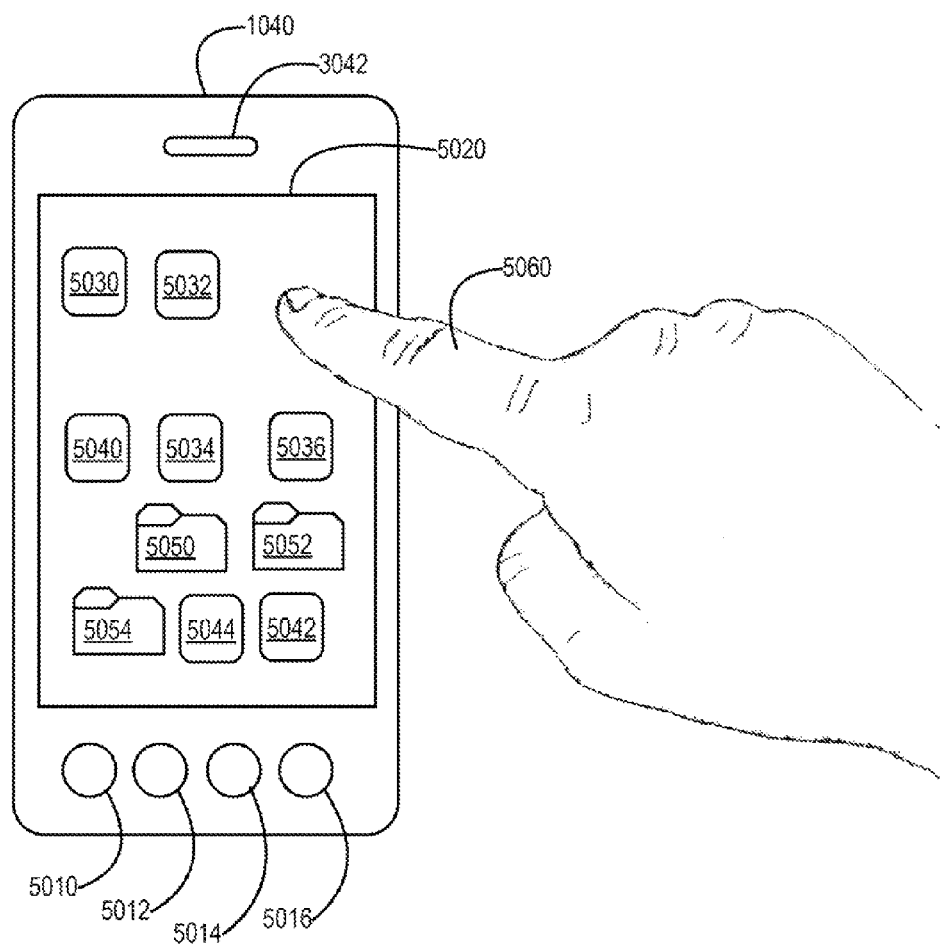
FIG. 5 illustrates a diagram of a mobile device and a portion of a user of the mobile device, according to one or more embodiments.

Turning now to FIG. 5, a diagram of a mobile device and a portion of a user of the mobile device are illustrated, according to one or more embodiments. As shown, MD 1040 can include one or more user selectable buttons 5010-5016. In one or more embodiments, buttons 5010-5016 can be coupled to input interface 3050. MD 1040 can include a touch screen 5020 that can be coupled to output interface 3040 and input interface 3050. As illustrated, icons 5030-5054 can be displayed by touch screen 5020. In one or more embodiments, icons 5030-5036 can represent files, icons 5040-5044 can represent applications (e.g., applications 3070-3072), and icons 5050-5054 can represent folders (e.g., folders or directories of a file system). In one or more embodiments, one or more of icons 5030-5054 can be selected by a digit (e.g., a finger) 5060 or other appendage of a user of MD 1040 and/or one or more of icons 5030-5054 can be selected by a stylus (not shown). In one or more embodiments, one or more of icons 5030-5054 can be selected by a mouse or other pointing device or system.

In one or more embodiments, an icon associated with an application (APP) can be selected by user input, and the APP can be executed by MD 1040. For example, icon 5040 can be selected by user input, and APP 3070 can be executed by MD 1040. In one or more embodiments, APP 3070 can be executed to configure one or more configurations and/or one or more user preferences of MD 1040. For example, APP 3070 can access, change, and/or store information in configuration 3080. In one or more embodiments, digit 5060 can drag an icon of icons 5030-5054 from a first portion of screen 5020 by selecting the icon, moving digit 5060 to a second portion of screen 5020, and removing digit 5060. In one example, digit 5060 can be kept in contact with screen 5020 or in close proximity to screen 5020 while dragging the icon. In another example, digit 5060 can select the icon, be removed from screen 5020, and select a portion of screen 5020. In one or more embodiments, digit 5060 can drag an icon an icon of icons 5030-5044 to an icon of folder icons 5050-5054. In one or more embodiments, a drag and drop process can include dragging a first icon associated with a file or application to a second icon associated with a folder.

Figure 6:
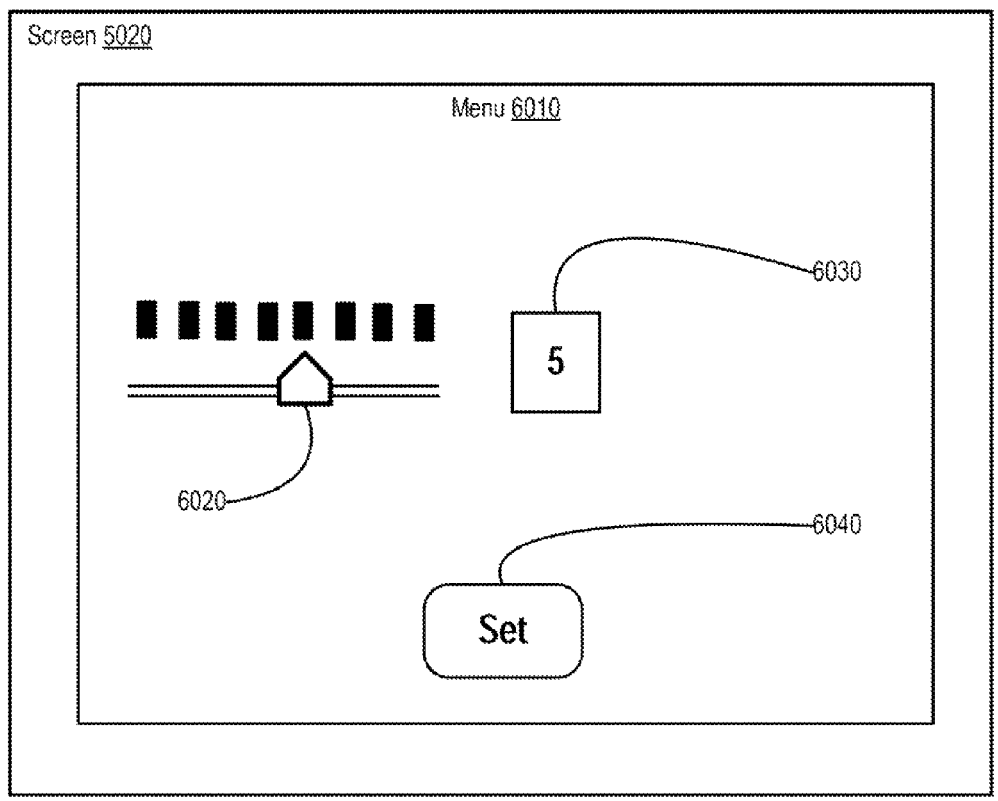
FIG. 6 provides a diagram of a menu usable to configure a mobile device, according to one or more embodiments.

Turning now to FIG. 6, a diagram of a menu usable to configure a mobile device is illustrated, according to one or more embodiments. As shown, screen 5020 can display a menu 6010. In one or more embodiments, menu 6010 can provide a user interface for APP 3070 which can be used to set a number of instances a wireless AP is encountered before wirelessly coupling to the wireless AP and/or notifying a user of MD 1040 with information associated with the wireless AP.

As illustrated, menu 6010 can include one or more of a slider 6020, a display or text field 6030, and a selection button or icon 6040. In one or more embodiments, slider 6020 can be selected by the user (e.g., using digit 5060) to select the number of instances the wireless AP is encountered before wirelessly coupling to the wireless AP and/or notifying the user of MD 1040 with information associated with the wireless AP. For example, slider 6020 can be used to transform qualitative user input into one or more quantitative values. For instance, slider 6020 can be used to receive user input and transform the user input into a value of five (5) as shown by display or text field 6030. In one or more embodiments, display or text field 6030 can be used to accept quantitative input. For example, display or text field 6030 can be selected by the user, and a keyboard can used to input a quantitative value (e.g., "5") into display or text field 6030.

In one or more embodiments, selection button or icon 6040 can be used in receiving user input indicating that the number of instances the wireless AP is encountered before wirelessly coupling to the wireless AP and/or notifying the user of MD 1040 with information associated with the wireless AP. For example, digit 5060 can select selection button or icon 6040, and APP 3070 can store, in configuration 3080, the number of instances the wireless AP is encountered before wirelessly coupling to the wireless AP and/or notifying the user of MD 1040 with information associated with the wireless AP.

Figure 7:
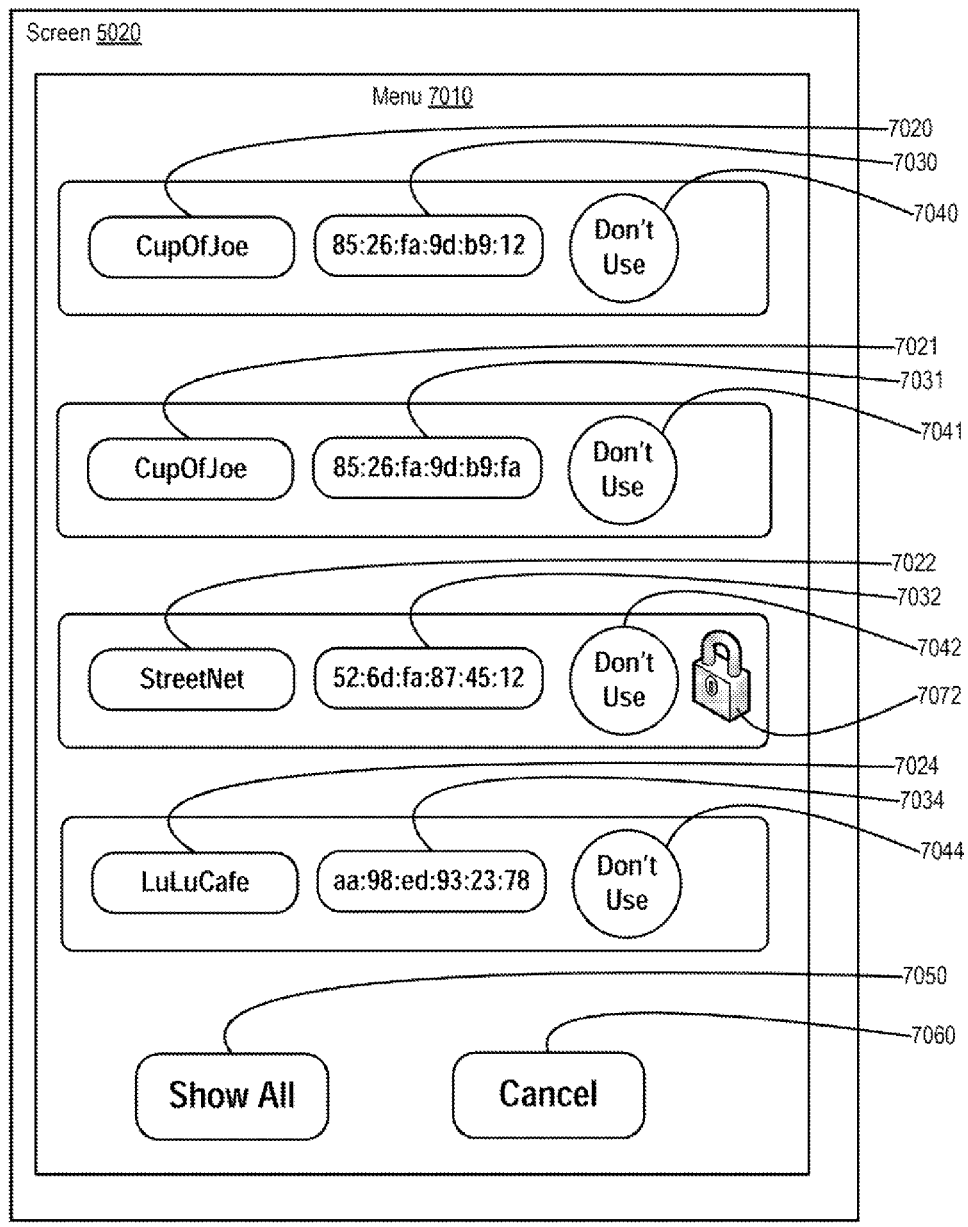
FIGS. 7 and 8 provide diagrams of menus usable to manage one or more connections of a mobile device to one or more wireless access points, according to one or more embodiments.

Turning now to FIG. 7, a diagram of a menu usable to manage one or more connections of a mobile device to a wireless access point is illustrated, according to one or more embodiments. As shown, screen 5020 can display a menu 7010 that can include one or more buttons or icons 7020-7072. In one or more embodiments, menu 7010 can provide a user interface for APP 3070 which can be used to select a wireless AP that was is encountered a number of times by MD 1040. In one or more embodiments, menu 7010 can display first identifications of respective wireless APs that are encountered over a period of time. For example, menu 7010 can display first identifications of respective wireless APs that are encountered over a number days (e.g., thirty days, sixty days, ninety days, etc.).

In one example, buttons or icons 7020-7023 and 7024 can display first identifications of respective wireless APs 1030-1032 and 1034. For instance, buttons or icons 7020-7022 and 7024 can display respective service set identifiers (SSIDs) of respective wireless APs 1030-1032 and 1034. In second example, buttons or icons 7030-7032 and 7034 can display second identifications of respective wireless APs 1030-1032 and 1034. For instance, buttons or icons 7030-7032 and 7034 can display respective MAC addresses of respective wireless APs 1030-1032 and 1034. In one or more embodiments, buttons or icons 7020-7022 and 7024 and/or buttons or icons 7030-7032 and 7034 can be selected by a user of MD 1040 to permit MD 1040 to communicate with respective wireless APs 1030-1032 and 1034.

In another example, one or more of buttons or icons 7040-7042 and 7044 can be selected to not use or not trust one or more of respective wireless APs 1030-1032 and 1034. In one or more embodiments, button or icon 7060 can be selected to conclude a connection process associated with one or more wireless APs. For example, communications via network 1013 may be used rather than using a wireless AP coupled to network 1014. In one or more embodiments, button or icon 7050 can be selected to display information associated with identifiable wireless APs within range of MD 1040, regardless of a number of times each wireless AP has been encountered. In one or more embodiments, icon 7072 can indicate that wireless AP 1032 uses a key, a password, and/or access code in wirelessly communicating with a MD. For example, wireless AP 1032 can use one or more of a WEP code and a WPA code, among others.

In one or more embodiments, a wireless AP can be identified by a combination of two or more identifiers. In one example, wireless AP 1030 can be identified by a combination of a SSID of "CupOfJoe" and a MAC address of 85:26:fa:9d:b9:12. In a second example, wireless AP 1031 can be identified by a combination of a SSID of "CupOfJoe" and a MAC address of 85:26:fa:9d:b9:fa. In another example, wireless AP wireless AP 1034 can be identified by a combination of a SSID of "LuLuCafe" and a MAC address of aa:98:ed:93:23:78. In one or more embodiments, a wireless AP can be identified by a single identifier. In one example, wireless AP 1030 can be identified by a MAC address of 85:26:fa:9d:b9:12. In a second example, wireless AP 1031 can be identified by a MAC address of 85:26:fa:9d:b9:fa. In another example, wireless AP wireless AP 1034 can be identified by a MAC address of aa:98:ed:93:23:78.

Figure 8:
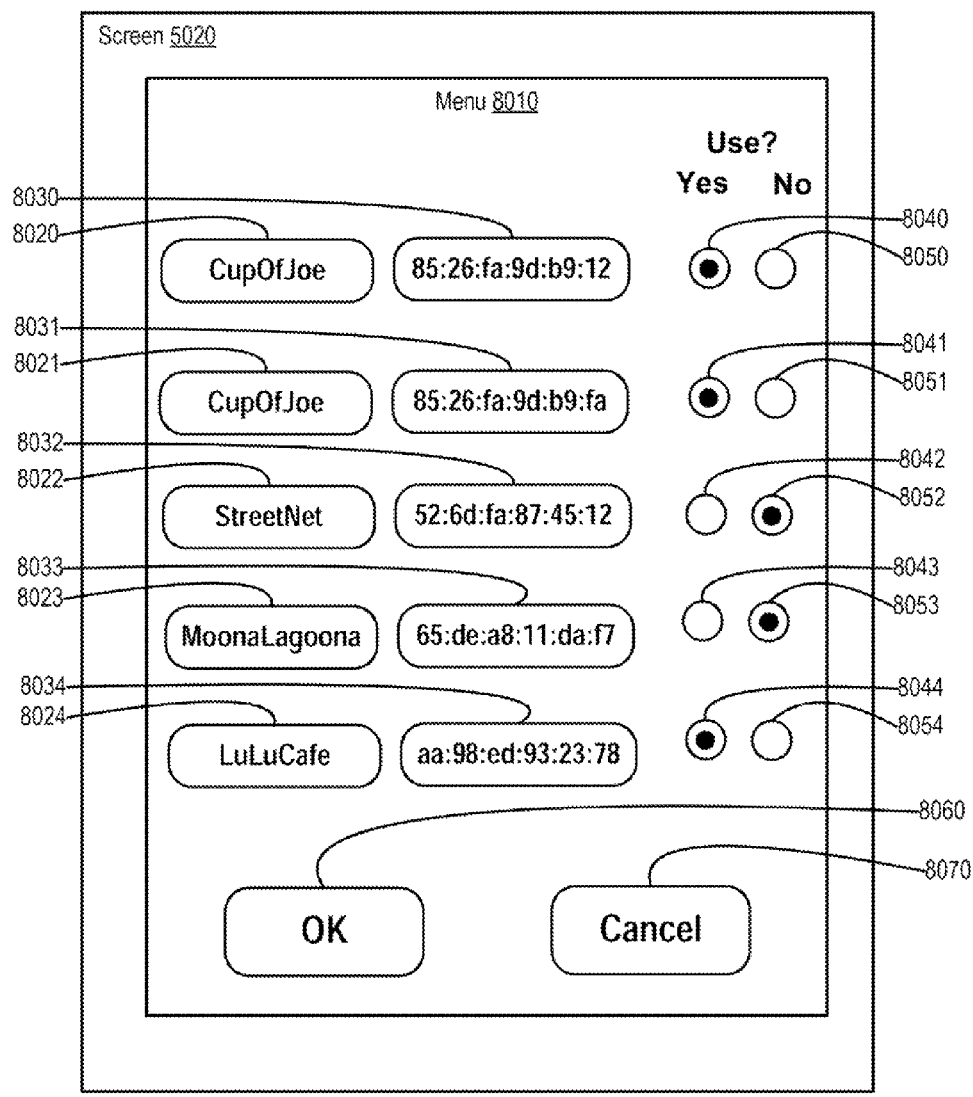

Turning now to FIG. 8, a diagram of a menu usable to manage one or more connections of a mobile device to a wireless access point is illustrated, according to one or more embodiments. As shown, screen 5020 can display a menu 8010 that can include one or more buttons or icons 8020-8070. In one or more embodiments, menu 8010 can provide a user interface for APP 3070 which can be used to determine whether or not to use a wireless AP that was is encountered a number of times by MD 1040.

In one example, buttons or icons 8020-8024 can display first identifications of respective wireless APs 1030-1034. For instance, buttons or icons 8020-8024 can display respective SSIDs of respective wireless APs 1030-1034. In second example, buttons or icons 8030-8034 can display second identifications of respective wireless APs 1030-1034. For instance, buttons or icons 8030-8034 can display respective MAC addresses of respective wireless APs 1030-1034. In one or more embodiments, buttons or icons 8040-8044 can respectively correspond to buttons or icons 8020-8024 and/or buttons or icons 8030-8034, and buttons or icons 8050-8054 can respectively correspond to buttons or icons 8020-8024 and/or buttons or icons 8030-8034. In one example, one or more of radio buttons 8040-8044 can be selected, via user input, to indicate that a respective one or more wireless APs 1030-1034 may be used in wireless communications. In another example, one or more of radio buttons 8050-8054 can be selected, via user input, to indicate that a respective one or more wireless APs 1030-1034 may not be used in wireless communications.

In one or more embodiments, icon or button 8060 can be selected, via user input, to indicate that a configuration can be stored. For example, the configuration can be stored in configuration 3080 and can include information that indicates whether or not a wireless AP can be used in wireless communications. For instance, the information represented via menu 8010, which can indicate whether or not a wireless AP can be used in wireless communications, can be stored in configuration 3080. In one example, wireless APs 1030, 1031, and 1034 may be used in wireless communications. In one or more embodiments, wireless APs 1032 and 1033 may not be used in wireless communications. In one or more embodiments, icon or button 8060 can be selected, via user input, to indicate that a configuration represented via menu 8010 can be stored. In one or more embodiments, icon or button 8070 can be selected, via user input, to indicate that a configuration was not changed and/or to indicate that any change indicated in menu 8010 can be discarded.

Figures 9, 10:
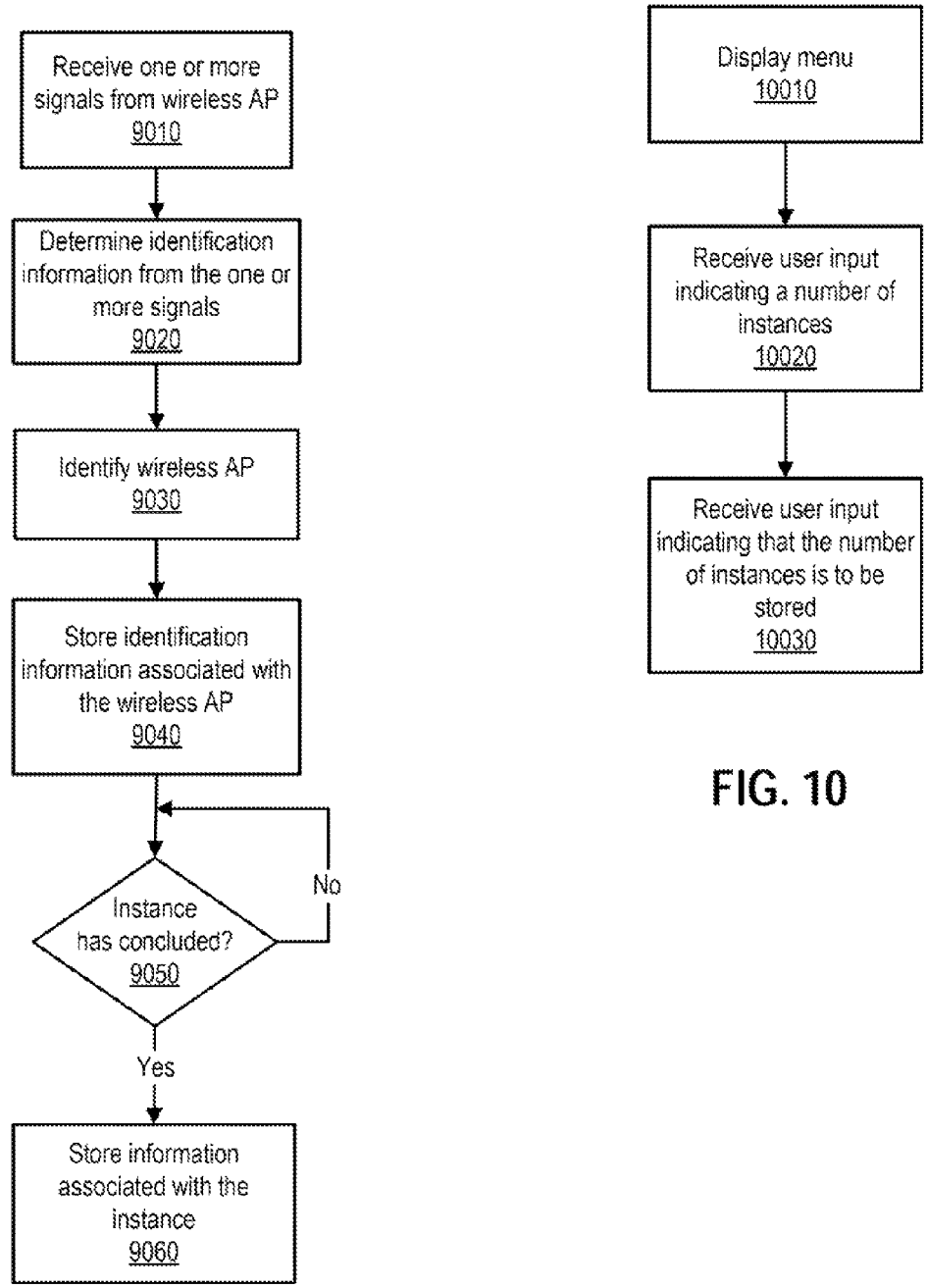
FIGS. 9-12 illustrate methods of operating a mobile device.

Turning now to FIG. 9, a method operating a mobile device is illustrated, according to one or more embodiments. At 9010, one or more signals from a wireless AP can be received. For example, MD 1040 can receive the one or more signals 1060 from wireless AP 1030. For instance, a transceiver of network interface 3031 can receive the one or more signals 1060. At 9020, identification information can be determined from the one or more signals. For example, MD 1040 can determine identification information from the one or more signals 1060. For instance, the identification information can be associated with wireless AP 1030 and/or can be used to identify wireless AP 1030. In one or more embodiments, the identification information can include one or more of a SSID, a BSSID, a MAC address, an IP address, an ISM band, a WEP code, and a WPA code, among others.

At 9030, a wireless AP can be identified. For example, MD 1040 can identify wireless AP 1030 via one or more of a SSID, a BSSID, a MAC address, an IP address, an ISM band, a WEP code, and a WPA code, among others. At 9040, an identification of the wireless AP can be stored. For example, MD 1040 can store, in memory 3020, an identification of wireless AP 1030. In one or more embodiments, storing the identification of the wireless AP can include storing one or more portions of the identification information determined from the received one or more signals. For example, MD 1040 can store, in memory 3020, one or more of a SSID, a BSSID, a MAC address, an IP address, an ISM band, a WEP code, and a WPA code determined from the one or more signals 1060.

At 9050, it can be determined whether or not an instance of encountering the wireless AP has concluded. In one or more embodiments, determining whether or not the instance of encountering the wireless AP has concluded can include determining whether or not wireless communications with the wireless AP has concluded. For example, MD 1040 may no longer wirelessly communicate with wireless AP 1030, and no longer wirelessly communicating with wireless AP 1030 can indicate a conclusion of the instance that wireless AP 1030 has been encountered.

In one or more embodiments, determining whether or not the instance of encountering the wireless AP has concluded can include determining whether or not the one or more signals are being received. For example, MD 1040 may no longer receive the one or more signals 1060, and no longer receiving the one or more signals 1060 can indicate a conclusion of the instance that wireless AP 1030 has been encountered. In one or more embodiments, the instance that wireless AP 1030 has been encountered can include a first period of time of receiving the one or more signals 1060 followed by a second period of time of not receiving the one or more signals 1060. For example, determining whether or not the instance of encountering the wireless AP has concluded can include determining whether or not the second period of time of not receiving the one or more signals 1060 has transpired.

If the instance of encountering the wireless AP has not concluded, method element 9050 can be performed, according to one or more embodiments. If the instance of encountering the wireless AP has concluded, information associated with the instance of encountering the wireless AP can be stored. In one example, MD 1040 can store, in memory 3020, one or more of a SSID, a BSSID, a MAC address, an IP address, an ISM band, a WEP code, and a WPA code, among others, associated with wireless AP 1030. In another example, MD 1040 can store, in memory 3020, one or more of a count and an enumeration of one or more instances of encountering wireless AP 1030. For instance, can increment one or more of a count and an enumeration, stored in memory 3020, of one or more instances of encountering wireless AP 1030.

Turning now to FIG. 10, a method operating a mobile device is illustrated, according to one or more embodiments. At 10010, a menu can be displayed. For example, menu 6010 can be displayed using information of configuration 3080. At 10020, user input can be received, where the user input can indicate a number of instances a wireless AP is encountered before wirelessly coupling to the wireless AP and/or notifying the user of the mobile device with information associated with the wireless AP. At 10030, user input can be received, where the user input can indicate that the number of instances can be stored. For example, the number of instances can be stored in configuration 3080.

Figure 11:
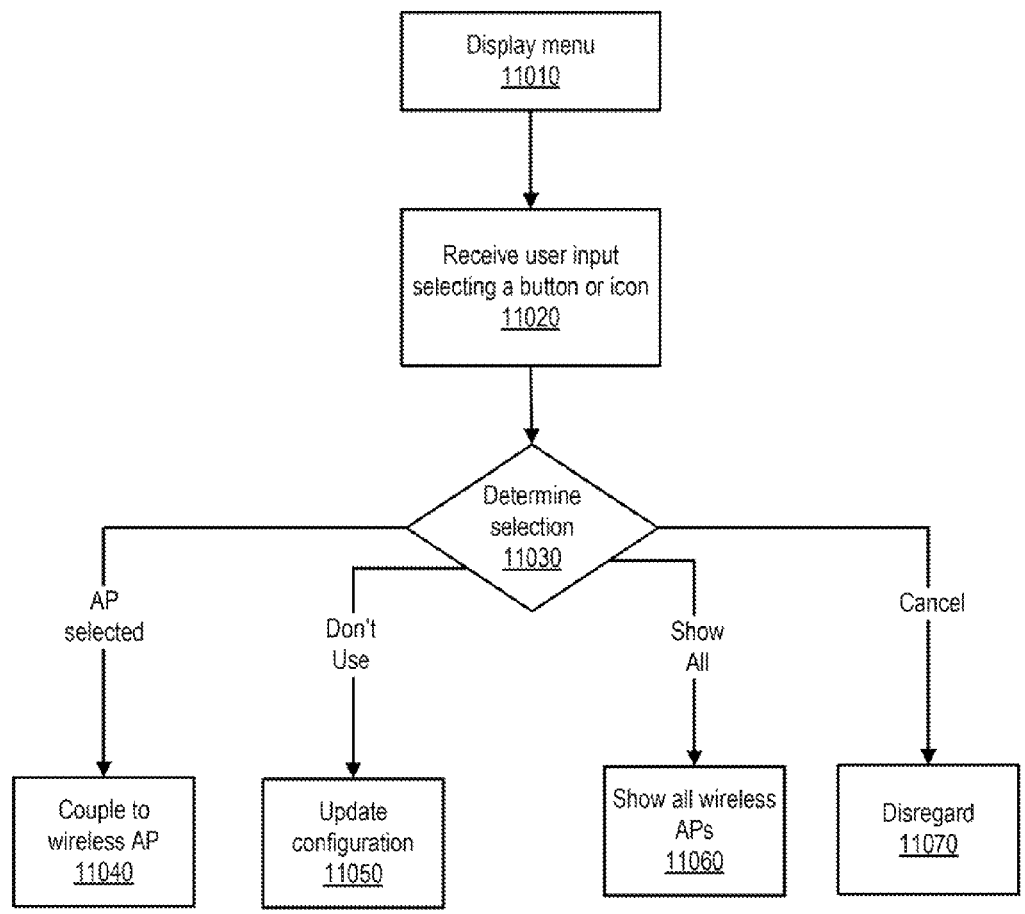

Turning now to FIG. 11, a method operating a mobile device is illustrated, according to one or more embodiments. At 11010, a menu can be displayed. For example, menu 7010 can be displayed using information of configuration 3080. At 11020, user input selecting a button or icon can be received. At 11030, a menu item selection can be determined. If a button or icon of buttons or icons 7020-7022 and 7024 or of buttons or icons 7030-7032 and 7034 is selected, the method can proceed to 11040 where the mobile device can wirelessly couple to a wireless AP corresponding to information displayed in the button or icon. If a button or icon of buttons or icons 7040-7042 and 7044 is selected, the method can proceed to 11050 where a configuration can be updated. For example, button or icon 7044 can be selected by the user input, and configuration 3080 can be updated such that information associated with wireless AP 1034 is not displayed by menu 7010.

If button or icon 7050 is selected, the method can proceed to 11060 where screen 5020 can display information associated with one or more wireless APs that may have not been encountered at least the number of times specified by the user of the mobile device. In one example, screen 5020 can display information associated with one or more wireless APs that may have not been encountered at least five (5) times. In another example, screen 5020 can display information associated with one or more wireless APs that may have not been encountered at least five (5) times within the last thirty (30) days. If button or icon 7060 is selected, the method can proceed to 11070 where the mobile device may not wireless couple to a wireless AP associated with the information of menu 7010. For example, the mobile device may use network 1013 for data communications rather than a wireless AP associated with the information of menu 7010.

Figure 12:
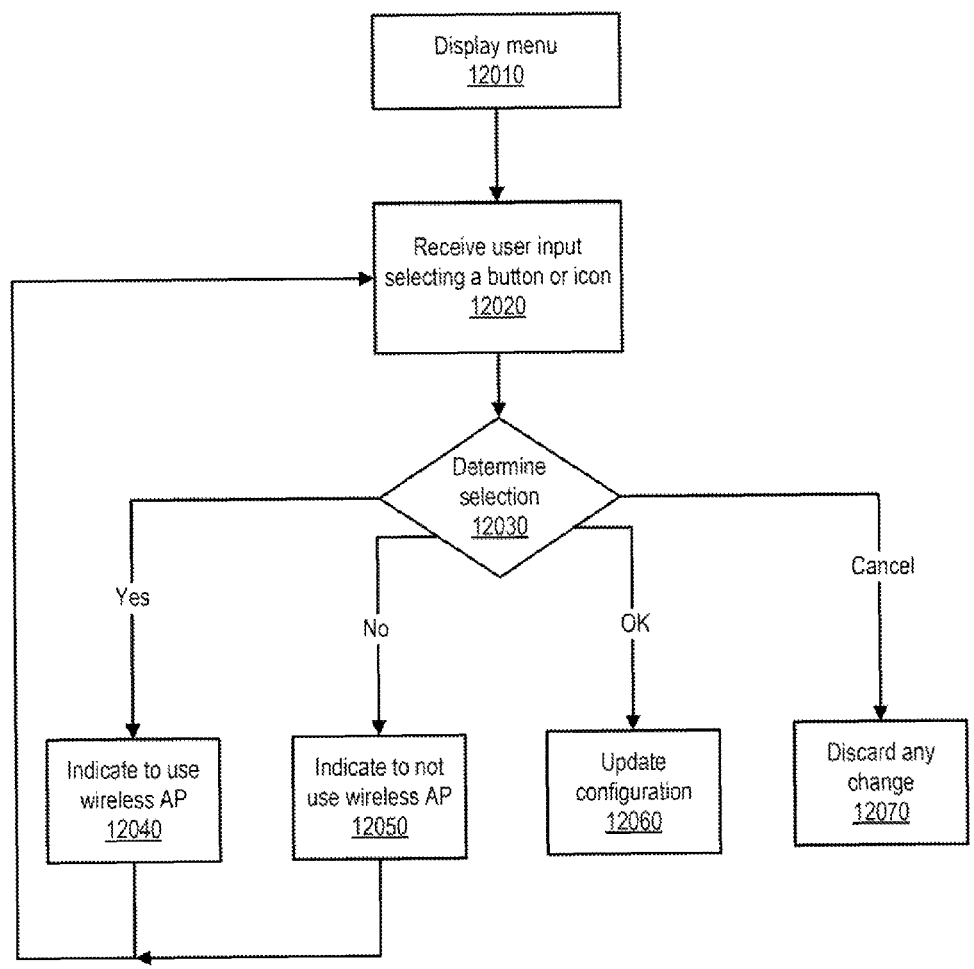

Turning now to FIG. 12, a method operating a mobile device is illustrated, according to one or more embodiments. At 12010, a menu can be displayed. For example, menu 8010 can be displayed using information of configuration 3080. At 12020, user input selecting a button or icon can be received. At 12030, a button or icon selection can be determined. If a button or icon of buttons or icons 8040-8044 is selected, the method can proceed to 12040 where menu 8010 can be updated to indicate that a wireless AP corresponding to the button or icon may be used. For example, button or icon 8040 can be selected by user input, and menu 8010 can be updated to indicate that wireless AP 1030 may be used. In one or more embodiments, the method can proceed to 12020.

If a button or icon of buttons or icons 8050-8054 is selected, the method can proceed to 12050 where menu 8010 can be updated to indicate that a wireless AP corresponding to the button or icon may not be used. For example, button or icon 8042 can be selected by user input, and menu 8010 can be updated to indicate that wireless AP 1032 may not be used. In one or more embodiments, the method can proceed to 12020.

If button or icon 8060 is selected, a configuration can be updated at 12060. For example, configuration 3080 can be updated to correspond with the information indicated in menu 8010. If button or icon 8070 is selected, any change in menu 8010 can be discarded at 12070.

It is noted that, in one or more embodiments, one or more of the method elements described herein and/or one or more portions of an implementation of a method element can be performed in varying orders, can be repeated, can be performed concurrently with one or more of the other method elements and/or one or more portions of an implementation of a method element, or can be omitted. Additional and/or duplicated method elements can be performed as desired. For example, a process and/or method can perform one or more described method elements concurrently with duplicates of the one or more described method elements. For instance, multiple methods, processes, and/or threads can be implemented using same described method elements. In one example, MD 1040 can concurrently implement some or all method elements of FIGS. 9-12 for use with two or more of wireless APs 1030-1035. In one or more embodiments, one or more of the method illustrated in FIGS. 9-12 can be repeated. For example, the method illustrated in FIG. 9 can be repeated in multiple encounters with a single wireless AP and/or repeated in multiple encounters with multiple wireless APs.

In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
at a processor of a wireless computing device, comparing a count of a number of times that the wireless computing device has encountered a wireless access point to a threshold, wherein an encounter corresponds to a first period of time of receiving a signal from the wireless access point followed by a second period of time of not receiving the signal from the wireless access point; and
conditionally sending identification information associated with the wireless access point to a display interface of the wireless computing device based on the count satisfying the threshold.

2. The method of claim 1, further comprising receiving user input indicating that coupling between the wireless computing device and the wireless access point is enabled.

3. The method of claim 1, further comprising:
coupling the wireless computing device with the wireless access point when the count satisfies the threshold; and
refraining from sending the identification information to the display interface when the count does not satisfy the threshold.

4. The method of claim 1, further comprising receiving user input indicating the threshold.

5. The method of claim 1, wherein the identification information associated with the wireless access point includes one or more of a service set identifier, a basic service set identifier, a media access control address, an Internet protocol address, an ISM band, a wired equivalent privacy code, and a Wi-Fi protected access code.

6. The method of claim 1, wherein the second period of time is ten minutes.

7. The method of claim 1, further comprising receiving user input indicating that wireless coupling between the wireless computing device and the wireless access point is disabled.

8. The method of claim 1, further comprising wirelessly coupling the wireless computing device with a second wireless access point when the count does not satisfy the threshold.

9. The method of claim 8, wherein the wireless access point is connected to a first network and the second wireless access point is connected to a second network, and wherein the second network has lower bandwidth capabilities than the first network.

10. A mobile device, comprising:
a processor; and
a memory accessible by the processor, wherein the memory includes instruction which when executed by the processor cause the processor to perform operations including:
comparing a count of a number of times that a wireless computing device has encountered a wireless access point to a threshold, wherein an encounter corresponds to a first period of time of receiving a signal from the wireless access point followed by a second period of time of not receiving the signal from the wireless access point; and
conditionally sending identification information associated with the wireless access point to a display interface based on the count satisfying the threshold.

11. The mobile device of claim 10, wherein the operations further include receiving, via an input interface, user input indicating that coupling between the wireless computing device and the wireless access point is enabled.

12. The mobile device of claim 10, wherein the operations further include:
receiving, via an input interface, user input that indicates selection of a button or icon associated with the identification information associated with the wireless access point; and
wirelessly coupling, via a network interface, to the wireless access point.

13. The mobile device of claim 12, wherein the operations further include receiving, via the input interface, user input indicating the threshold.

14. The mobile device of claim 12, wherein the identification information includes one or more of a service set identifier, a basic service set identifier, a media access control address, an Internet protocol address, an ISM band, a wired equivalent privacy code, and a Wi-Fi protected access code.

15. A computer readable memory medium comprising instructions, which when executed on a processing system, cause the processing system to perform operations including:
comparing a count of a number of times that a wireless computing device has encountered a wireless access point satisfies to a threshold, wherein an encounter corresponds to a first period of time of receiving a signal from the wireless access point followed by a second period of time of not receiving the signal from the wireless access point; and
conditionally sending identification information associated with the wireless access point to a display interface of the wireless computing device based on the count satisfying the threshold.

16. The computer readable memory medium of claim 15, wherein the operations further include:
displaying a menu based on the identification information associated with the wireless access point; and
receiving user input indicating that coupling between the wireless computing device and the wireless access point is enabled.

17. The computer readable memory medium of claim 15, wherein the operations further include:
receiving user input that indicates a selection of a button or icon associated with the identification information associated with the wireless access point; and
coupling the wireless computing device to the wireless access point.

18. The computer readable memory medium of claim 15, wherein the identification information from the wireless access point includes one or more of a service set identifier, a basic service set identifier, a media access control address, an Internet protocol address, an ISM band, a wired equivalent privacy code, and a Wi-Fi protected access code.

* * * * *